United States Patent Office 3,470,200
Patented Sept. 30, 1969

3,470,200
PHTHALOCYANINE DYESTUFFS FOR BALL-POINT PEN INKS
Norman L. Anderson, Hamburg, N.Y., assignor to Allied Chemical Corporation, New York, N.Y., a corporation of New York
No Drawing. Filed July 22, 1965, Ser. No. 474,141
Int. Cl. C09b 47/04
U.S. Cl. 260—314.5    12 Claims

ABSTRACT OF THE DISCLOSURE

Production of phthalocyanine dyestuffs useful as colorants for ball-point pen inks, characterized by imparting to such inks excellent fastness to water, by reaction of a metal phthalocyanine disulfonic acid and a diphenyl guanidine substituted by an alkyl group containing 4–12 carbon atoms and, optionally, by an alkyl group containing 1–3 carbon atoms, in each of the benzene rings of said diphenyl guanidine.

---

This invention relates to improved colorants for ball-point pen inks which are characterized by imparting to such inks excellent fasteness to water.

Inks for ball-point pens must meet many exacting specifications in order to perform satisfactorily. Thus, they must have high tinctorial value, yet the color should not crystallize out at the high concentrations employed. The solvents used must have very low volatility to prevent evaporation and consequent clogging or freezing of the ball in the socket of the point. The viscosity of ball-point pen inks should be such that the ink will not leak from the pen point nor from the open end of the supply tube when the pen is inverted. Yet the viscosity must not be so high as to prevent free flow of ink at the ball and socket while writing. In addition, ball-point pen inks must be free of solid foreign matter and must be non-corrosive to the metal parts of the pen with which it comes in contact. Finally, for the purpose of permanence, the written record produced by ball-point pen inks should have good light fasteners and water fastness.

Dyestuffs generally available for use in ball pen ink formulations are deficient in their resistance to water bleed. This is particularly true of the diaryl guanidine salts of dyestuffs containing sulfonic acid groups, such as the phthalocyanine sulfonic acid series described in U.S. 2,153,740 and 3,010,970.

It has now been found that the novel colorants of the present invention have greatly improved resistance to water bleed as compared to currently used colorants of this type. The preferred colorants of the present invention have the formula shown below:

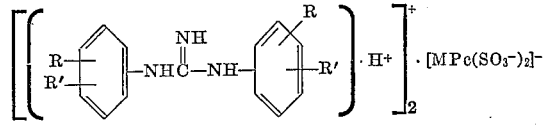

wherein R is an alkyl group of from 4 to 12 carbon atoms; R' represents members of the group consisting of H, $CH_3$, $C_2H_5$ and $C_3H_7$; and MPc represents a metal phthalocyanine such as copper, cobalt, and nickel. The colorants represented by this formula can be defined as salts containing two mols of a basic guanidine component and one mol of a metal phthlocyanine disulfonic acid. The basic component is a diphenyl guanidine of the structure:

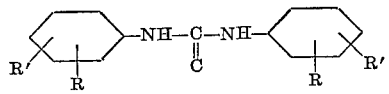

where R and R' have the values defined above.

The colorants of the present invention are soluble in solvents such as benzyl alcohol and alkylene glycols, e.g., propylene glycol, diethylene glycol, 1,3-butanediol and octylene glycol but insoluble in water. When used in ball-point pen formulations, they produce a turquoise blue shade of excellent water fastness. Such formulations have additional beneficial properties, such as, improved storage stability and an appreciable reduction in the corrosion of the ball and socket of the pen, as compared to formulations prepared with conventional dyestuffs exemplified by Color Index Solvent Blue 38.

The colorants of this invention are ordinarily prepared by heating a mixture of an aqueous solution of one or a mixture of the above defined substituted diaryl guanidine salts, preferably the hydrochloride, and an aqueous solution of a metal phthalocyanine disulfonic acid salt of preferably an alkali metal at a temperature ranging from 25° C. to 100° C. The resulting salt of the guanidine component and the phthalocyanine disulfonic acid, being insoluble in water, precipitates from the solution as the desired colored product. It is then isolated, dried, and ground.

As examples of diarylguanidines having a $C_4$–$C_{12}$ alkyl group as a substitutent on each of the benzene rings, suitable for the purpose of this invention, the following may be mentioned:

1,3-bis(p-sec-butylphenyl)guanidine
1,3-bis(p-n-butyl-o-tolyl)guanidine
1,3-bis(4-pentyl-2-methylphenyl)guanidine
1,3-bis[4-(1-methylpentyl)phenyl]guanidine
1,3-bis[(1-methylpentyl)mixed xylyl]guanidine
1,3-bis(4-n-hexyl-2-methylphenyl)guanidine
1,3-bis[4-(1-methylheptyl)phenyl]guanidine
1,3-bis(p-dodecylphenyl)guanidine Mixtures of the above or equivalent alkyl diaryl guanidines may also be used.

Phthalocyanine disulfonic acids which may be reacted with the above guanidines and mixtures thereof to prepare the colorants of the present invention include the copper, cobalt, and nickel compounds.

The following representative examples are illustrative of the invention only and are not intended to limit the scope of the invention.

Example 1.—Preparation of colorant

The colorant of this example is a salt in which the basic component is a bis(amylphenyl)guanidine and the acid component is copper phthalocyanine disulfonic acid. The guanidine component was prepared as follows: an amyl aniline, prepared by reacting n-amyl alcohol with aniline, was reacted with carbon disulfide to form the bis(amyl)thiocarbanilide which was then heated with litharge and ammonia to produce the desired bis(amylphenyl)guanidine compound. To 34.8 g. (0.1 mole) of the above prepared bis(amylphenyl)guanidine suspended in 1 liter of water, was added sufficient 20° Bé. hydrochloric acid to effect solution (slightly acid to light Congo test paper).

The copper phthalocyanine disulfonic acid (sodium salt) solution was prepared as follows: A paste of 30% copper phthalocyanine disulfonic (120 g. equivalent to 36 g., 0.05 mol of 100%) was slurried in 600 ml. of water. The slurry was neutralized to a pH of 6–6.5 with calcium hydroxide and then to a pH of 9.8–10 with soda ash. At this point the copper phthalocyanine disulfonic acid was sompletely in solution as the sodium salt. Five grams of Solka Floc (a purified wood cellulose filter aid) was added and the mixture was sludge filtered to remove precipitated calcium sulfate and other insolubles common to plant manufactured copper phthalocyanine disulfonic acid paste. To the filtrate was added 3 g. of Nullapon (ethylenediaminetetraacetic acid tetrasodium salt, a chelating agent), the pH was adjusted to 8–8.2 with 20° Bé. hydrochloric acid, and sufficient water was added to double the volume.

The above solution of copper phthalocyanine disulfonic acid (sodium salt) was agitated at room temperature and the previously prepared solution of bis(amylphenyl)guanidine hydrochloride was gradually added. The resulting product, a fine, blue precipitate, was filtered and washed salt free with water then dried and ground in a micropulverizer.

Example 2.—Preparation of ink

An ink was prepared using micropulverized colorant from the above example as follows:

| Component: | Part by weight |
|---|---|
| Colorant | 40 |
| Propylene glycol | 58 |
| Oleic acid | 2 |

The ingredients were mixed in a high speed blender at 70–80° C. until complete solution of the colorant was effected. The solution was then centrifuged to remove traces of solid matter.

Concentrations of the colorant ranging from 30% to 40% can be used to produce inks of satisfactory tinctorial strength for use in ball-point pens. A small amount (1% to 5%) of oleic acid is generally incorporated in these formulations to serve as a lubricant for the ball and socket.

Example 3.—Water-bleed tests

A commonly used test of water-fastness is that described in U.S. Government Federal Specifications No. TT–1–562 (June 12, 1950) which requires that ball-point pen inks provide samples of writing which remain legible and do not run appreciably after soaking in water for 48 hours.

For purposes of comparison, the above test was applied using an ink designated (III) prepared from the colorant essentially as described in Example 2 and inks designated (I) and (II) respectively prepared from the copper phthalocyanine disulfonic acid salts of (I) di-(ortho-tolyl)guanidine and (II) di(mixed xylyl)guanidine. These inks are those described in U.S. 3,010,970. The inks were applied on Bond-type paper. The results show that the scribbles produced by inks I and II are nearly completely obliterated while that from ink III prepared from a colorant of this invention remains unaffected.

A quick water-bleed test is performed in the following manner. A heavy ink line is made on a bibulous paper strip using 20 pen strokes (10 forward and 10 backward). The paper is immersed in water, keeping the ink line above the surface of the water, for about 1 to 2 minutes then removed. As the water continues to be absorbed up the strip by capillary action it eventually crosses the ink line. If the ink is not water-fast it will "bleed" up the paper strip. This test was performed using the same inks as employed above and the results show extensive bleeding of inks I and II while no bleeding occurred with ink III.

These tests demonstrate unequivocally the superior water-fastness of the ball-point pen ink colorants of this invention.

The terms and expressions employed are terms of description and not of limitation. It is recognized that various modifications are within the scope of the invention.

I claim:

1. A phthalocyanine dyestuff of the formula:

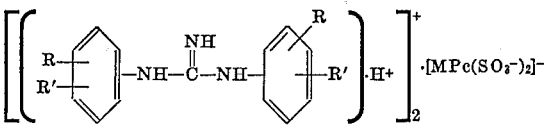

wherein R represents an alkyl group of from 4–12 carbon atoms and is substituted in the para position relative to the nitrogen atom attached to the phenyl ring bearing said R substituent, R' represents a member of the group consisting of hydrogen, methyl, ethyl and propyl and is substituted in an ortho position relative to the nitrogen atom attached to the phenyl ring bearing said R' substituent, and MPc represents a metal phthalocyanine group in which M is a metal being a member selected from the group consisting of copper, cobalt and nickel and Pc is a phthalocyanine radical.

2. A phthalocyanine dyestuff as defined in claim 1 wherein M is copper.

3. A phthalocyanine dyestuff as defined in claim 1 wherein M is cobalt.

4. A phthalocyanine dyestuff as defined in claim 1 wherein M is nickel.

5. A phthalocyanine dyestuff as defined in claim 1 wherein the alkyl substituted diphenyl guanidine is 1,3-bis(p-sec-butylphenyl) guanidine.

6. A phthalocyanine dyestuff as defined in claim 1 wherein the alkyl substituted diphenyl guanidine is 1,3-bis(p-n-butyl-o-tolyl) guanidine.

7. A phthalocyanine dyestuff as defined in claim 1 wherein the alkyl substituted diphenyl guanidine is 1,3-bis(4-pentyl-2-methylphenyl) guanidine.

8. A phthalocyanine dyestuff as defined in claim 1 wherein the alkyl substituted diphenyl guanidine is 1,3-bis 4-(1-methylpentyl)phenyl guanidine.

9. A phthalocyanine dyestuff as defined in claim 1 wherein the alkyl substituted diphenyl guanidine is 1,3-bis(4-n-hexyl-2-methylphenyl) guanidine.

10. A phthalocyanine dyestuff as defined in claim 1 wherein the alkyl substituted diphenyl guanidine is 1,3-bis 4-(1-methylheptyl)phenyl guanidine.

11. A phthalocyanine dyestuff as defined in claim 1 wherein the alkyl substituted diphenyl guanidine is 1,3-bis(p-dodecylphenyl) guanidine.

12. A phthalocyanine dyestuff as defined in claim 1 wherein the alkyl substituted diphenyl guanidine is 1,3-bis(amylphenyl) guanidine.

References Cited

UNITED STATES PATENTS

| | | | |
|---|---|---|---|
| 3,082,213 | 3/1963 | Pugin et al. | 260—314.5 |
| 3,010,970 | 11/1961 | Fiess | 260—314.5 |
| 2,153,740 | 4/1939 | Carleton et al. | 260—314.5 |

HENRY R. JILES, Primary Examiner

H. I. MOATZ, Assistant Examiner

U.S. Cl. X.R.

106—23